United States Patent
Yen et al.

(10) Patent No.: US 7,282,985 B2
(45) Date of Patent: Oct. 16, 2007

(54) CHARGE PUMP WITH AT LEAST TWO OUTPUTS

(75) Inventors: Chih-Jen Yen, Hsinchu (TW); Liang-Kuei Hsu, Chiayi County (TW)

(73) Assignee: Novatek Microelectronics Corp., Hsinchu (TW)

( * ) Notice: Subject to any disclaimer, the term of this patent is extended or adjusted under 35 U.S.C. 154(b) by 150 days.

(21) Appl. No.: 11/161,178

(22) Filed: Jul. 26, 2005

(65) Prior Publication Data

US 2006/0244513 A1    Nov. 2, 2006

(30) Foreign Application Priority Data

Apr. 28, 2005   (TW) .............................. 94113628 A

(51) Int. Cl.
H02M 3/18     (2006.01)
G05F 3/08     (2006.01)
(52) U.S. Cl. ..................... 327/536; 363/59; 307/110
(58) Field of Classification Search ..................... None
See application file for complete search history.

(56) References Cited

U.S. PATENT DOCUMENTS

| | | | | |
|---|---|---|---|---|
| 5,262,934 A | * | 11/1993 | Price ............................ | 363/60 |
| 5,532,916 A | * | 7/1996 | Tamagawa ..................... | 363/62 |
| 6,906,577 B2 | * | 6/2005 | Kim ............................ | 327/536 |
| 6,960,955 B2 | * | 11/2005 | Nonaka ........................ | 327/536 |
| 2005/0012542 A1 | * | 1/2005 | Kushima et al. ............ | 327/536 |

* cited by examiner

Primary Examiner—Kenneth B. Wells
Assistant Examiner—Terry L. Englund
(74) Attorney, Agent, or Firm—Jianq Chyun IP Office

(57) ABSTRACT

"A charge pump used for producing at least a first output voltage and a second output voltage according to an input voltage is disclosed. The charge pump includes a pump unit, first to fourth switches, a first output capacitor and a second output capacitor. During a first period, the input voltage and a first voltage, through a first end and a second end of the pump unit respectively, charge at least an internal capacitor. During a second period, the internal capacitor, based on a second voltage level of the first switch and through the second switch, provides the first output capacitor with charges for producing the first output voltage. Finally, during a third period, the internal capacitor, based on a third voltage level of the third switch and through the fourth switch, provides the second output capacitor with charges for producing the second output voltage."

9 Claims, 10 Drawing Sheets

US 7,282,985 B2

CHARGE PUMP WITH AT LEAST TWO OUTPUTS

CROSS-REFERENCE TO RELATED APPLICATION

This application claims the priority benefit of Taiwan application serial no. 94113628, filed on Apr. 28, 2005. All disclosure of the Taiwan application is incorporated herein by reference.

BACKGROUND OF THE INVENTION

1. Field of Invention

The present invention relates to a charge pump, and particularly to a charge pump with fewer capacitors and capable of providing at least a first output voltage and a second output voltage.

2. Description of the Related Art

In an electronic circuit, a plurality of charge pump circuits are usually required for providing various power voltage levels. If, for example, an electronic circuit needs a voltage of two times as high as the power voltage level and a negative voltage of the power voltage level, there must be a charge pump circuit with a voltage doubling circuit (as shown in FIG. 1) to provide a double positive voltage level VOUT+ and another charge pump circuit with a negative voltage circuit (as shown in FIG. 3) to provide a negative power voltage level VOUT−.

FIG. 1 is a schematic circuit drawing of a conventional voltage doubling charge pump circuit. FIG. 2 is a schematic chart showing the control signal timing of the charge pump switches in the FIG. 1. Referring to FIG. 1 and FIG. 2, during a charge period CP, the control signal ph1 takes a high level and the control signal ph2 takes a low level. The control signal turns on the switches 101 and 102, and turns off the switches 103 and 104. At this time, an input voltage VIN and a ground voltage GND are coupled to both sides of the capacitor 105 and charge the capacitor 105 so that the voltage difference between the node N1 and node N2 takes the input voltage VIN. During the following pump period PP, however, the control signal ph1 takes a low level and the control signal ph2 takes a high level. Thus, the switches 101 and 102 are off, and the switches 103 and 104 are on. Meanwhile, the voltage level of the node N2 rises from the original ground voltage 0V to the input voltage VIN. In this way, the level of the node N1 rises from the original voltage VIN to 2VIN and the capacitor 106 is charged, and 2VIN serves as a positive output voltage VOUT+.

FIG. 3 is a schematic circuit drawing of a conventional negative voltage charge pump circuit. The control signal timing of the charge pump switches in FIG. 3 is the same as in FIG. 2. Referring to FIG. 3 and FIG. 2, during a charge period CP, the control signal ph1 takes a high level and the control signal ph2 takes a low level. The control signal turns on the switches 301 and 303, and turns off the switches 302 and 304. At this time, an input voltage VIN and a ground voltage GND are coupled to both sides of the capacitor 305 and charge the capacitor 305 so that the voltage difference between the node N3 and node N4 takes the input voltage VIN. During the following pump period PP, the control signal ph1 takes a low level and the control signal ph2 takes a high level. Thus, the switches 301 and 303 are off, and the switches 302 and 304 are on. Meanwhile, the voltage level of the node N3 drops from the original VIN to the ground level 0V. In this way, the level of the node N4 drops from the original voltage 0V to −VIN and the capacitor 306 is charged, and −VIN serves as a negative output voltage VOUT−.

For an integrated circuit, capacitor components, for example the capacitors 105 and 106 in FIG. 1 and the capacitors 305 and 306 in FIG. 3, usually occupy a lot of space, which leads to a high production cost. Even if the capacitor components are moved outside of the IC, i.e. the capacitor components become external components of the IC, the external capacitors would still increase the cost.

SUMMARY OF THE INVENTION

An object of the present invention is to provide a charge pump for outputting various voltages and having fewer capacitor components and lower cost.

Based on the above-described object and the others, the present invention provides a charge pump used for producing at least a first output voltage and a second output voltage according to an input voltage. The charge pump includes a pump unit, a first switch, a second switch, a third switch, a fourth switch, a first output capacitor and a second output capacitor. The pump unit includes at least an internal capacitor, a first end, a second end, a third end, a fourth end, a fifth end and a sixth end. Wherein, the first end of the pump unit is coupled to the input voltage and the second end is coupled to a first voltage. The first end and the second end are used for charging the internal capacitor with the input voltage and the first voltage during a first period. During a second period, the internal capacitor, based on the voltage level of the third end of the pump unit, provides the fourth end with the first output voltage. During a third period, the internal capacitor, based on the voltage level of the fifth end of the pump unit, provides the sixth end with the second output voltage. One end of the first switch is coupled to the second voltage and another end thereof is coupled to the third end of the pump unit. In this way, the second voltage is connected to the third end of the pump unit during the second period. The first end of the second switch is coupled to the fourth end of the pump unit for connecting the first output voltage from the fourth end of the pump unit to the second end of the second switch. One end of the third switch is coupled to the third voltage and another end thereof is coupled to the fifth end of the pump unit for connecting the third voltage to the fifth end of the pump unit during the third period. The first end of the fourth switch is coupled to the sixth end of the pump unit for connecting the second output voltage from the sixth end of the pump unit to the second end of the fourth switch during the third period.

In the pump unit of the embodiments, the above-mentioned first voltage and third voltage are, for example, ground voltages, and the second voltage is, for example, an input voltage.

In the pump unit of the embodiments, the above-described pump unit further includes a fifth switch and a sixth switch. The first end of the fifth switch is just the first end of the pump unit, and the second end of the fifth switch is coupled to the first end of the internal capacitor. Wherein, the first end of the internal capacitor serves as both the fourth end and the fifth end of the pump unit. The first end of the sixth switch is the second end of the pump unit, and the second end of the sixth switch is coupled to the second end of the internal capacitor. Wherein, the second end of the internal capacitor serves as both the third end and the sixth end of the pump unit.

In the pump unit of the embodiments, the above-described pump unit further includes N pieces of internal capacitors, wherein N is an integer larger than zero. Wherein, all the internal capacitors are parallel connected between the first end and the second end of the pump unit during the first period. During the second period, all the internal capacitors are connected in series and serve as an internal capacitor series so that the high-voltage end of the internal capacitor series is coupled to the fourth end of the pump unit and the low-voltage end of the internal capacitor series is coupled to the third end of the pump unit. Moreover, during the third period, all the internal capacitors are connected in series with each other and serve as an internal capacitor series so that the high-voltage end of the internal capacitor series is coupled to the fifth end of the pump unit and the low-voltage end thereof is coupled to the sixth end of the pump unit.

From the above described it can be seen that the internal capacitors in the pump unit of the present invention are dynamically coupled. Therefore, the internal capacitors can be shared in a charge pump to provide at least a first output voltage and a second output voltage. In this way, the number of capacitor components and the production cost can be significantly reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
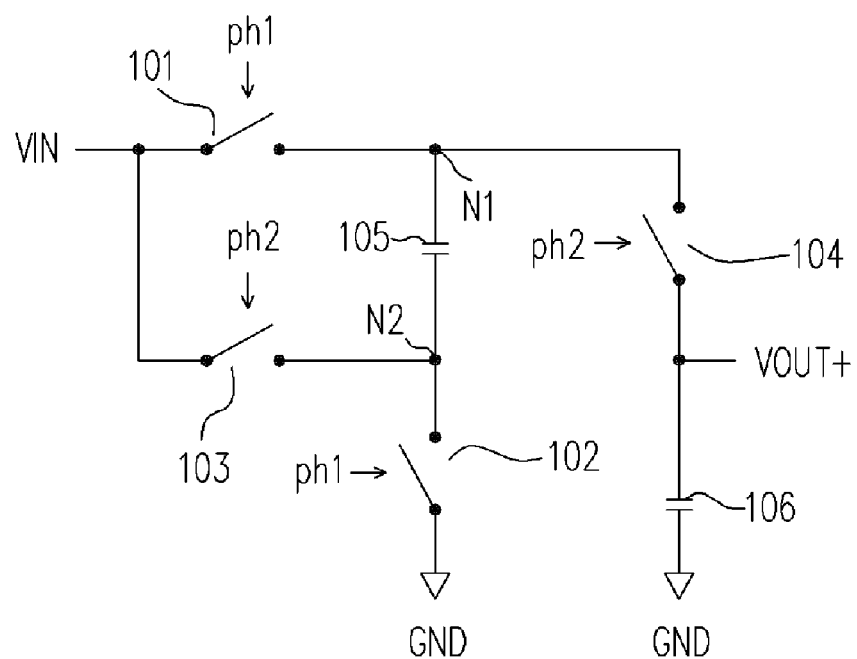
FIG. 1 is a schematic circuit drawing of a conventional voltage doubling charge pump circuit.
Figure 2:
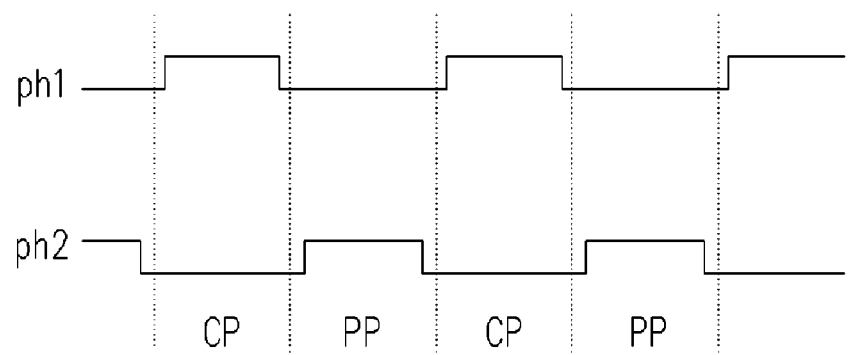
FIG. 2 is a schematic chart showing the control signal timings of the charge pump switches in the FIG. 1 and FIG. 3.
Figure 3:
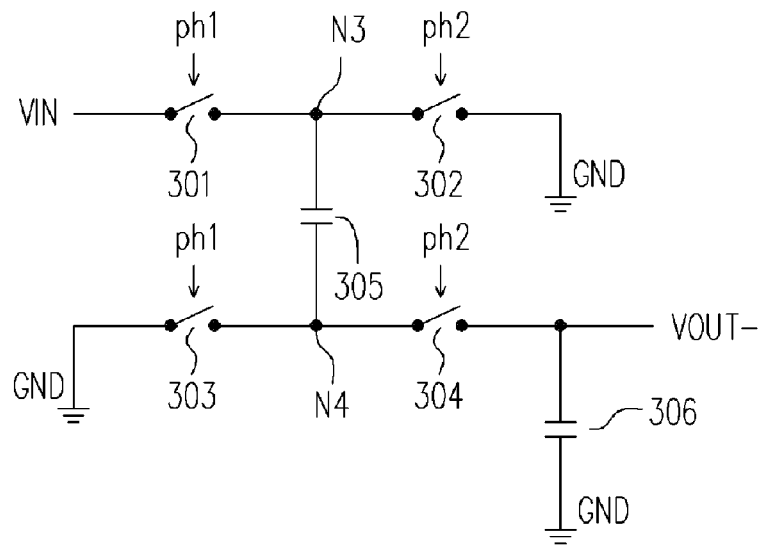
FIG. 3 is a schematic circuit drawing of a conventional negative voltage charge pump circuit.
Figure 4:
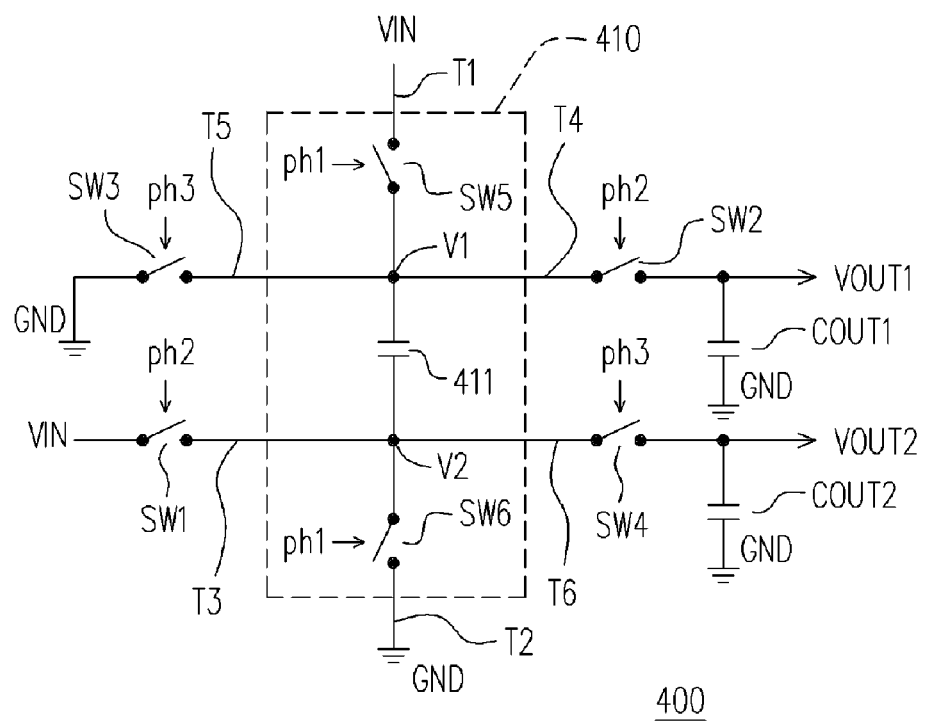
FIG. 4 is a schematic circuit drawing of a charge pump according to an embodiment of the present invention.
Figure 5:
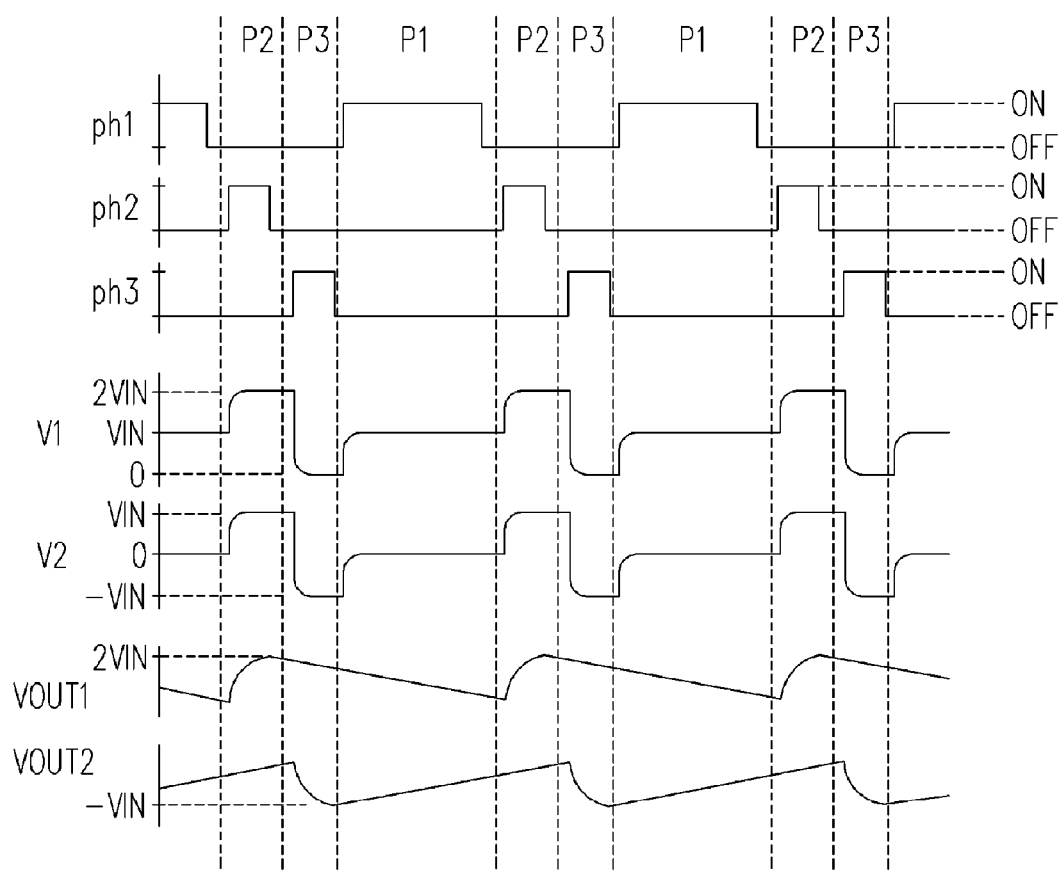
FIGS. 5-7 are schematic charts showing the control signal timings of the charge pump in FIG. 4.

FIG. 4 is a schematic circuit drawing of a charge pump according to an embodiment of the present invention. FIG. 5 is a schematic chart showing the control signal timings of the charge pump in FIG. 4. Referring to FIG. 4 and FIG. 5, a charge pump 400 is connected to an input voltage VIN for outputting a first output voltage VOUT1 and a second output voltage VOUT2. The charge pump 400 includes, for example, a pump unit 410, a first switch SW1, a second switch SW2, a third switch SW3, a fourth switch SW4, a first output capacitor COUT1 and a second output capacitor COUT2.

The first end T1 of the pump unit 410 is coupled to the input voltage VIN and the second end T2 thereof is coupled to the first voltage (in the embodiment, the first voltage is the ground voltage GND). The pump unit 410 in the embodiment includes, for example, an internal capacitor 411, a fifth switch SW5 and a sixth switch SW6. The first end of the fifth switch SW5 is the first end T1 of the pump unit 410, and the second end of the fifth switch SW5 is coupled to the first end of the internal capacitor 411, which serves as both the fourth end T4 and the fifth end T5 of the pump unit 410. The first end of the switch SW6 is the second end T2 of the pump unit 410, and the second end thereof is coupled to the second end of the capacitor 411, which serves as both the third end T3 and the sixth end T6 of the pump unit 410.

One end of the switch SW1 is coupled to the second voltage (i.e. the input voltage VIN, herein), and another end thereof is coupled to the third end T3 of the pump unit 410. The first end of the switch SW2 is coupled to the fourth end T4 of the pump unit 410. The second end of the switch SW2 is coupled to one end of the capacitor COUT1 for providing the first output voltage VOUT1 (the first output voltage VOUT1 herein is, for example, two times as high as the input voltage VIN). In addition, another end of the capacitor COUT1 is coupled to the fourth voltage (i.e. the ground voltage GND, herein).

One end of the switch SW3 is coupled to the third voltage (i.e. the ground voltage GND, herein), and another end thereof is coupled to the fifth end T5 of the pump unit 410. The first end of the switch SW4 is coupled to the sixth end T6 of the pump unit 410. The second end of the switch SW4 is coupled to one end of the capacitor COUT2 for providing the second output voltage VOUT2 (the second output voltage VOUT2 herein is, for example, a negative voltage as high as the input voltage VIN). In addition, another end of the capacitor COUT2 is coupled to the fifth voltage (i.e. the ground voltage GND, herein).

During the first period P1, the control signal ph1 takes a high level, while the control signals ph2 and ph3 take a low level. Thus, the switches SW5 and SW6 are on and the switches SW1, SW2, SW3 and SW4 are off. At this time, the input voltage VIN and the ground voltage GND are coupled to both sides of the capacitor 411, respectively, and charge the capacitor so that the voltage difference between the node V1 and the node V2 equals to the input voltage VIN.

During the following period, i.e. the second period P2, the control signals ph1 and ph3 take a low level, while the control signal ph2 takes a high level. Thus, the switches SW3, SW4, SW5 and SW6 are off and the switches SW1 and SW2 are on. At this time, the level of the node V2 rises from the original ground voltage 0V to the input voltage VIN and the level of the node V1 accordingly rises from the original VIN to 2VIN and the capacitor COUT1 is charged. Meanwhile, the capacitor COUT1 outputs the first output voltage VOUT1 with a 2VIN level.

During the following third period P3, the control signals ph1 and ph2 take a low level, while the control signal ph3 takes a high level. Thus, the switches SW1, SW2, SW5 and SW6 are off and the switches SW3 and SW4 are on. At this time, the level of the node V1 drops from 2VIN to the ground voltage 0V and the level of the node V2 accordingly drops from the original VIN to −VIN and the capacitor COUT2 is charged. Meanwhile, the capacitor COUT2 outputs the second output voltage VOUT2 with a −VIN level.

Figure 6:
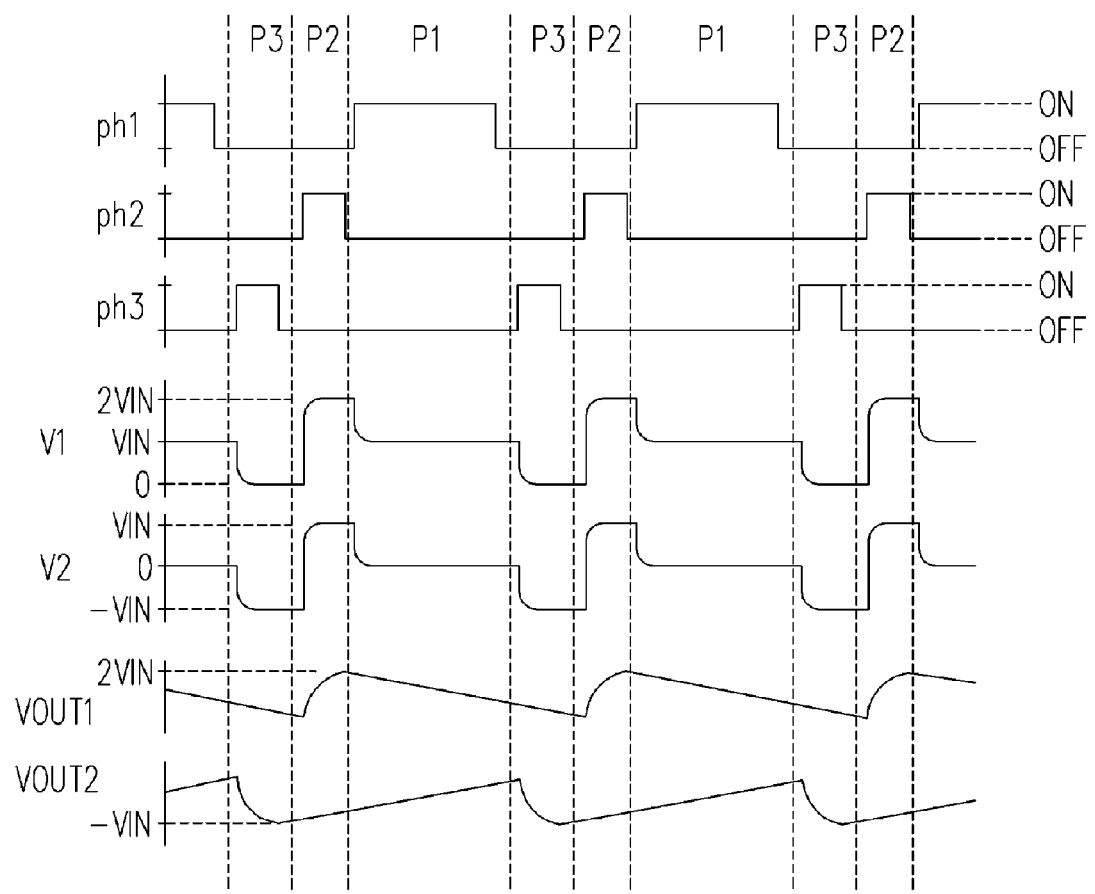

The above-mentioned first voltage, second voltage and third voltage can be specified as various voltage levels depending on the actual requirement. In addition, the control timing of each switch is not limited to that shown in FIG. 5. For example, FIG. 6 shows another timing chart of the charge pump 400 in FIG. 4. Referring to FIG. 4 and FIG. 6, during the first period P1, the control signal ph1, ph2 and ph3 turn on the switches SW5 and SW6 and turn off the switches SW1, SW2, SW3 and SW4. At this time, the input voltage VIN and the ground voltage GND are coupled to both sides of the capacitor 411 (V1 and V2), respectively. During the following third period P3, the switches SW1, SW2, SW5 and SW6 are off and the switches SW3 and SW4 are on. At this time, the level of the node V1 drops from VIN to the ground voltage 0V and the level of the node V2 accordingly drops from the original ground voltage 0V to –VIN and the capacitor COUT1 is charged. Meanwhile, the capacitor COUT2 outputs the second output voltage VOUT2 with a –VIN level. Further, during the second period P2, the switches SW3, SW4, SW5 and SW6 are off and the switches SW1 and SW2 are on. At this time, the level of the node V2 rises from –VIN to VIN and the level of the node V1 accordingly rise from the original ground voltage 0V to 2VIN and the capacitor COUT1 is charged. Meanwhile, the capacitor COUT1 outputs the first output voltage VOUT1 with a 2VIN level.

Figure 7:
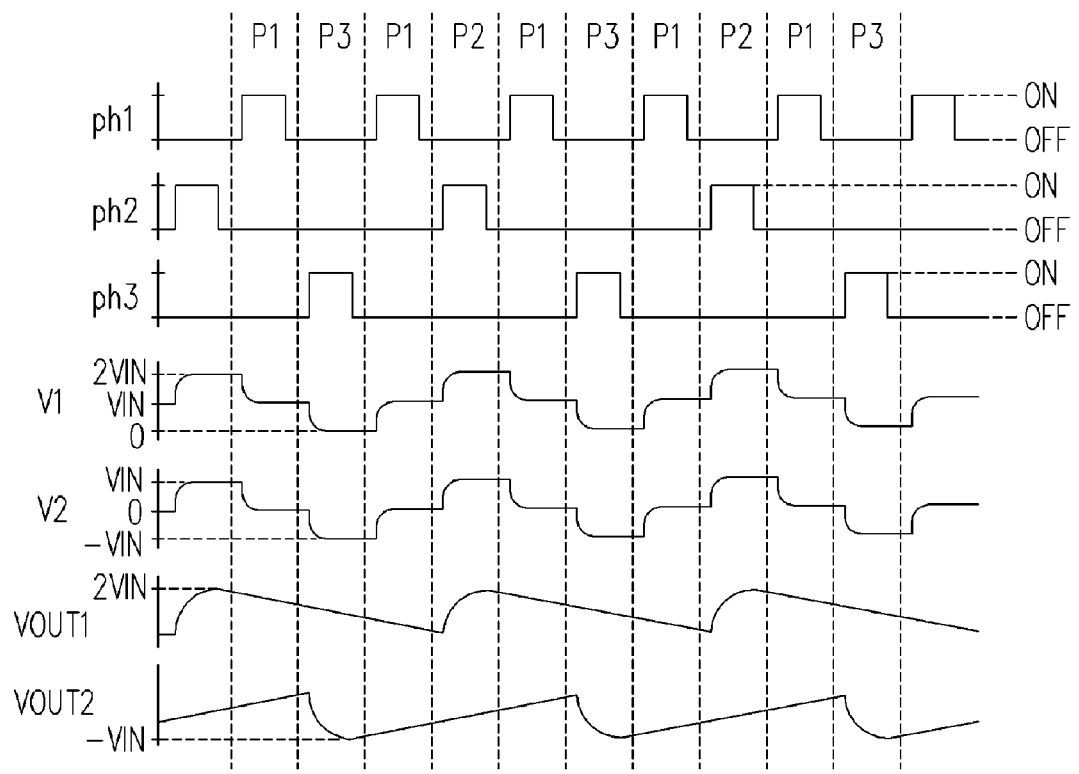

Alternatively, the capacitor 411 can be charged (corresponding to the first period P1) before the first output voltage VOUT1 (corresponding to the second period P2) and the second output voltage VOUT2 (corresponding to the third period P3) are output, as shown in FIG. 7. The control process is omitted herein.

Figure 8:
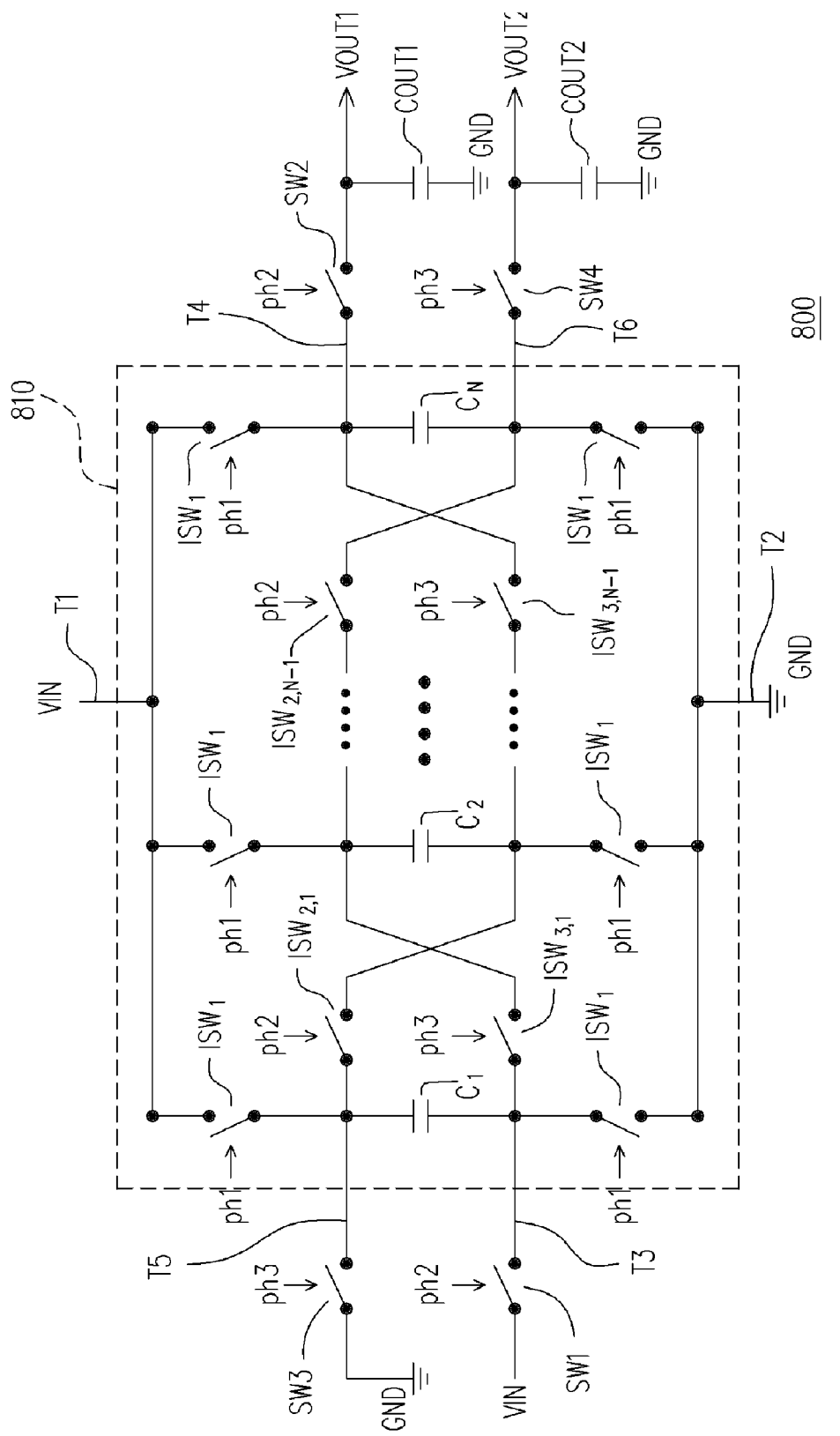
FIG. 8 is a schematic circuit drawing of a voltage (N+1) doubling charge pump circuit and a voltage negative −N doubling charge pump circuit according to an embodiment of the present invention.

The present invention can also provide the first output voltage and the second output voltage with other multiplication than the above-described. A charge pump suitable for providing (N+1) times and –N times of output voltages according to another embodiment is described hereinafter. Referring to FIG. 8, a charge pump 800 includes, for example, a pump unit 810, a first switch SW1, a second switch SW2, a third switch SW3, a fourth switch SW4, a first output capacitor COUT1 and a second output capacitor COUT2.

One end of the switch SW1 is coupled to the second voltage (for example, the input voltage VIN herein) and another end thereof is coupled to the third end T3 of the pump unit 810. The first end of the switch SW2 is coupled to the fourth end T4 of the pump unit 810. The second end of the switch SW2 is coupled to one end of the capacitor COUT1 for providing the first output voltage VOUT1 with (N+1) times as high as the input voltage VIN. Another end of the capacitor COUT1 is coupled to the fourth voltage (for example, the ground voltage GND herein).

One end of the switch SW3 receives the third voltage (for example, the ground voltage GND herein) and another end thereof is coupled to the fifth end T5 of the pump unit 810. The first end of the switch SW4 is coupled to the sixth end T6 of the pump unit 810. The second end of the switch SW4 is coupled to one end of the capacitor COUT2 for providing the second output voltage VOUT2 with –N times as high as the input voltage VIN. Another end of the capacitor COUT2 is coupled to the fifth voltage (for example, the ground voltage GND herein).

The pump unit 810 includes internal capacitors $C_1$-$C_N$ (N is an integer larger than zero), the first internal switches $ISW_1$, second internal switches $ISW_{2,1}$-$ISW_{2,N-1}$ and third internal switches $ISW_{3,1}$-$ISW_{3,N-1}$. The first end T1 of the pump unit 810 is coupled to the input voltage VIN, and the second end T2 thereof is coupled to the first voltage (for example, the ground voltage GND herein). The first end of the capacitor $C_1$ is coupled to the fifth end T5 of the pump unit 810, and the second end thereof is coupled to the third end T3 of the pump unit 810. The first end of the capacitor $C_N$ is coupled to the fourth end T4 of the pump unit 810, and the second end thereof is coupled to the sixth end T6 of the pump unit 810. As shown in FIG. 8, each switch $ISW_1$ is disposed between the first end of the corresponding capacitors $C_1$-$C_N$ and the first end T1 of the pump unit 810, and between the second end of the corresponding capacitors $C_1$-$C_N$ and the second end T2 of the pump unit 810, respectively. Among the switches $ISW_{2,1}$-$ISW_{2,N-1}$, the first end of the switch $ISW_{2,j}$ is coupled to the first end of the capacitor $C_j$, and the second end of the switch $ISW_{2,j}$ is coupled to the second end of the capacitor $C_{j+1}$ (j is an integer larger than zero but smaller than N). Among the switches $ISW_{3,1}$-$ISW_{3,N-1}$, the first end of the switch $ISW_{3,k}$ is coupled to the second end of the capacitor $C_k$, and the second end of the switch $ISW_{3,k}$ is coupled to the first end of the capacitor $C_{k+1}$ (k is a integer larger than zero but smaller than N).

During the first period P1, the control signals ph1, ph2, ph3 turn on the switches $ISW_1$ and turn off the switches SW1, SW2, SW3, SW4, $ISW_{2,1}$-$ISW_{2,N-1}$ and $ISW_{3,1}$-$ISW_{3,N-1}$. Thus, the capacitors $C_1$-$C_N$ are parallel coupled between the first end T1 and the second end T2 of the pump unit 810. At this point, the input voltage VIN and the ground voltage GND together charge the parallel capacitors $C_1$-$C_N$, and make the voltage difference between both ends of every capacitor equal to the input voltage VIN.

During the following second period P2, the control signals ph1, ph2 and ph3 turn on the switches SW1, SW2 and $ISW_{2,1}$-$ISW_{2,N-1}$, and turn off the switches SW3, SW4, $ISW_1$ and $ISW_{3,1}$-$ISW_{3,N-1}$. Thus, the capacitors $C_1$-$C_N$ are connected in series and serve as an internal capacitor series, and the low-voltage end of the internal capacitor series (the second end of the capacitor $C_1$) is coupled to the third end T3 of the pump unit 810. The high-voltage end of the internal capacitor series (the first end of the capacitor $C_N$) charges the capacitor COUT1 through the fourth end T4 of the pump unit 810 and the switch SW2, and the capacitor COUT1 outputs the first output voltage with a level (N+1) of times as high as VIN.

During the third period P3, the control signals ph1, ph2 and ph3 turn on the switches SW3, SW4 and $ISW_{3,1}$-$ISW_{3,N-1}$, and turn off the switches SW1, SW2, $ISW_1$ and $ISW_{2,1}$-$ISW_{2,N-1}$. T capacitors $C_1$-$C_N$ are connected in series and serve as an internal capacitor series, and the high-voltage end of the internal capacitor series (the first end of the capacitor $C_1$) is coupled to the fifth end T5 of the pump unit 810. The low-voltage end of the internal capacitor series (the second end of the capacitor $C_N$) charges the capacitor COUT2 through the sixth end T6 of the pump unit 810 and the switch SW4, and the capacitor COUT2 outputs the second output voltage with a level of –N times as high as VIN.

To those skilled in the art, the capacitor number (i.e. the N value) inside the pump unit 810 can be determined to meet the actual requirement. The first output voltage VOUT1 and the second output voltage VOUT2 with corresponding times of levels are accordingly produced. Besides, the times of levels of the first output voltage VOUT1 and the second output voltage VOUT2 can be adjusted by setting the above-described first voltage, second voltage and third voltage with other various levels of voltages. For example, the switch SW1 in FIG. 8 can receive the ground voltage GND instead of the input voltage VIN, so that the modified charge pump 800 is able to output a N times voltage and a –N times voltage. Similarly, the switch SW1 can be coupled to VIN/2 instead of the original input voltage VIN, so that the modified charge pump 800 is able to output a (N+½) times voltage and a –N times voltage.

Also, for those skilled in the art, the switches $ISW_{3,1}$-$ISW_{3,N-1}$ in the pump unit 810 of the charge pump 800 can be turned off (or the switches $ISW_{3,1}$-$ISW_{3,N-1}$ are removed), so that the charge pump 800 is able to output a (N+1) times voltage and a (N−1) times voltage. Moreover, the switches $ISW_{2,1}$-$ISW_{2,N-1}$ can be turned off (or the switches $ISW_{2,1}$-$ISW_{2,N-1}$ are removed), so that the modified charge pump 800 is able to output a −N times voltage and a −(N−2) times voltage.

Figure 9:
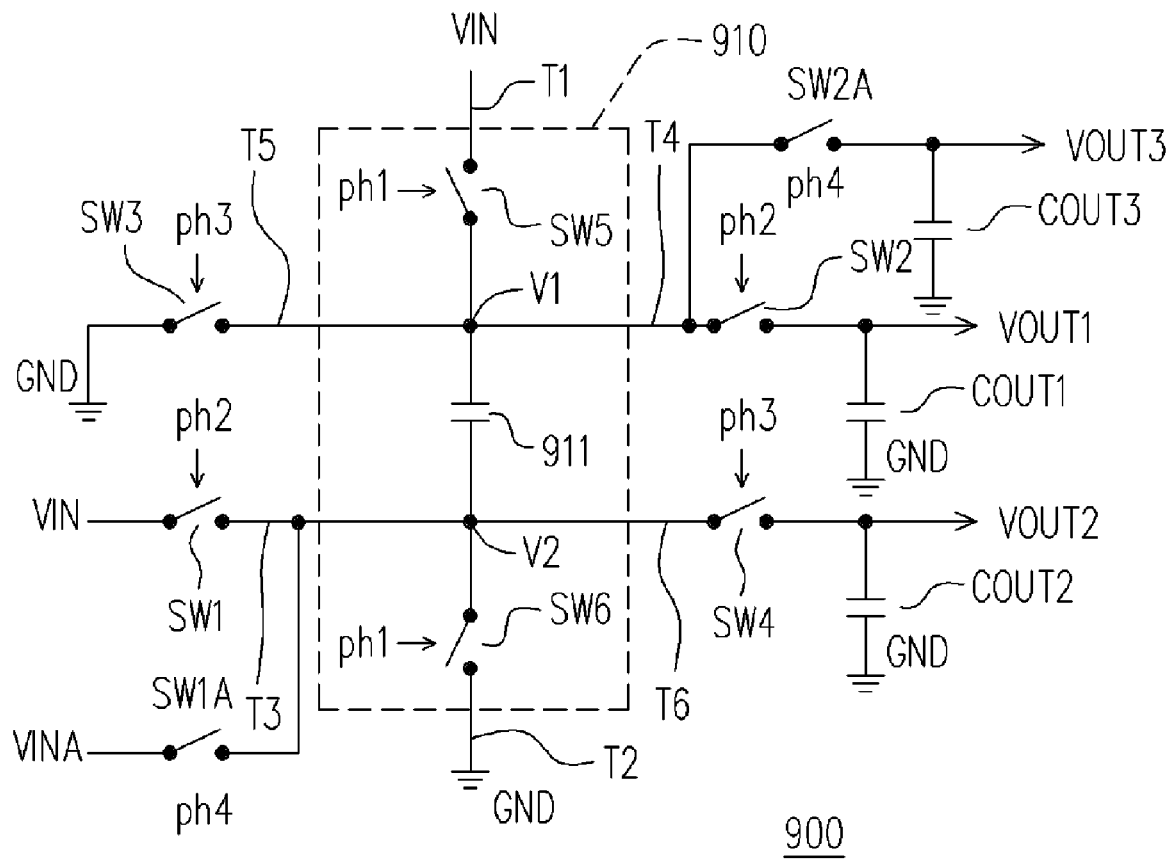
FIG. 9 is a schematic circuit drawing of a charge pump according to another embodiment of the present invention.

The number of the output voltage in the charge pump of the present invention is not limited. In FIG. 9 for example, the charge pump 900 is able to output three voltages, 2VIN, VIN+VINA and −VIN, where the VINA level is different from the voltage VIN. More examples are given hereinafter and may give those skilled in the art a suggestion.

Figure 10:
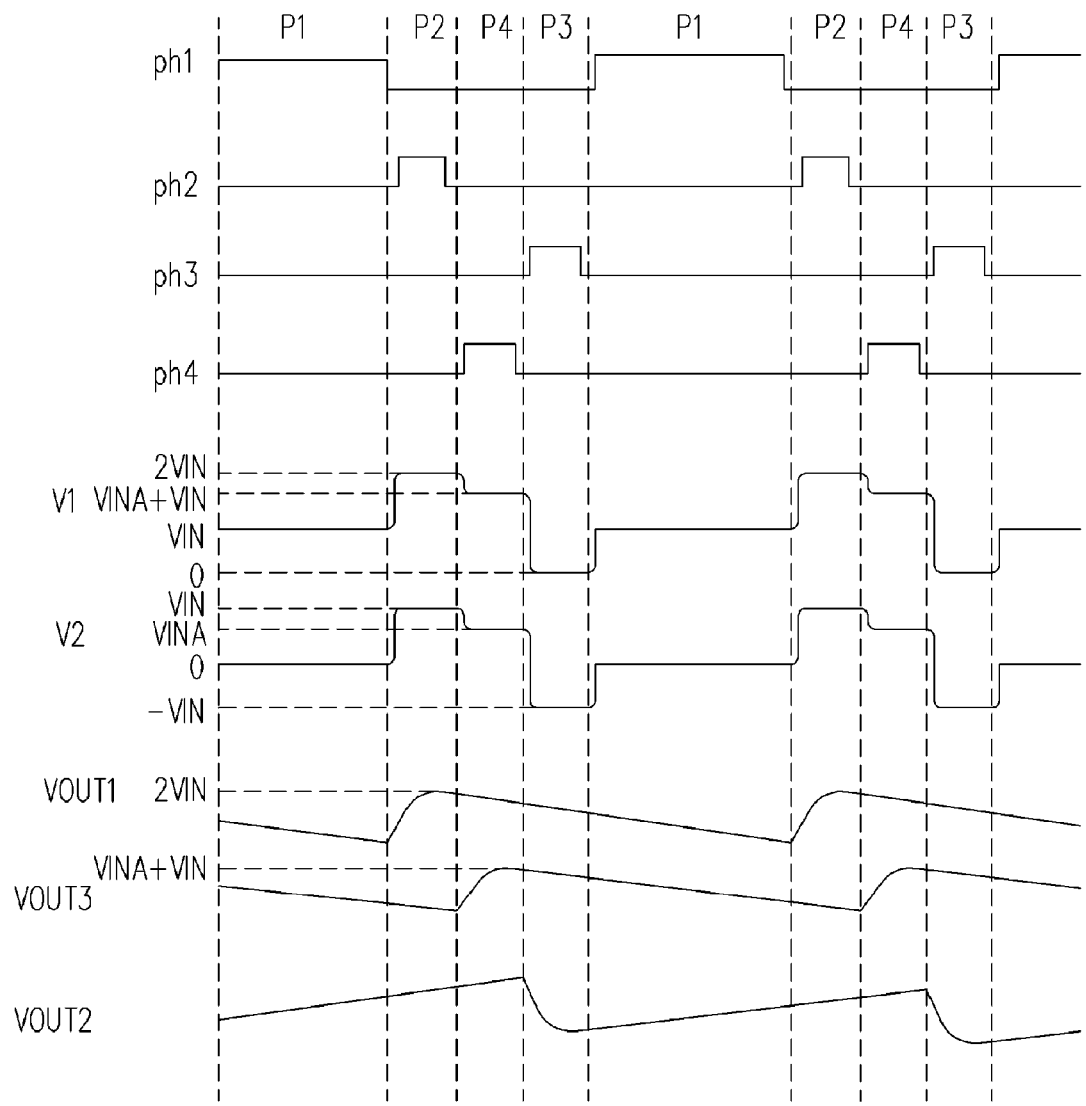
FIGS. 10-11 are schematic charts showing the control signal timings of the charge pump in FIG. 9.

FIG. 9 is a schematic circuit drawing of a charge pump according to another embodiment of the present invention. FIG. 10 is a schematic chart showing the control signal timing of the charge pump in FIG. 9. Referring to FIG. 9 and FIG. 10, the charge pump 900 is coupled to an input voltage VIN, and the charge pump 900 outputs a first output voltage VOUT1, a second output voltage VOUT2 and a third output voltage VOUT3. The charge pump 900 includes, for example, a pump unit 910, a first switch SW1, a second switch SW2, a third switch SW3, a fourth switch SW4, a seventh switch SW1A, an eighth switch SW2A, a first output capacitor COUT1, a second output capacitor COUT2 and a third output capacitor COUT3.

The pump unit 910 having a capacitor 911 is similar to the pump unit 410 in FIG. 4. One end of the switch SW1 is coupled to a second voltage (for example, the input voltage VIN herein), and another end thereof is coupled to the third end T3 of the pump unit 910. The first end of the switch SW2 is coupled to the fourth end T4 of the pump unit 910, and the second end thereof is coupled to one end of the capacitor COUT1 for providing the first output voltage VOUT1 (the first output voltage VOUT1 is, for example, two times as high as the input voltage VIN herein). The turning on/off of the switches SW1 and SW2 is determined by the control signal ph2. Another end of the capacitor COUT1 is coupled to the fourth voltage (for example, the ground voltage GND herein).

One end of the switch SW3 is coupled to the third voltage (for example, the ground voltage GND herein), and another end thereof is coupled to the fifth end T5 of the pump unit 910. The first end of the switch SW4 is coupled to the sixth end T6 of the pump unit 910, while the second end of the switch SW4 is coupled to one end of the capacitor COUT2 for providing the second output voltage VOUT2 (the second output voltage VOUT2 is, for example, the negative voltage of the input voltage VIN herein). The turning on/off of the switches SW3 and SW4 is determined by the control signal ph3. Another end of the capacitor COUT2 is coupled to the fifth voltage (for example, the ground voltage GND herein).

One end of the switch SW1A is coupled to the sixth voltage (for example, the reference voltage VINA with a level different from the input voltage VIN herein), and another end thereof is coupled to the third end T3 of the pump unit 910. The first end of the switch SW2A is coupled to the fourth end T4 of the pump unit 910. The second end of the switch SW2A is coupled to one end of the capacitor COUT3 for providing the third output voltage VOUT3 (the level of the third output voltage VOUT3 is, for example, VIN+VINA herein). The turning on/off of the switches SW1A and SW2A is determined by the control signal ph4.

Another end of the capacitor COUT3 is coupled to the seventh voltage (for example, the ground voltage GND herein).

During the first period P1, the control signal ph1 takes a high level, and the control signals ph2, ph3 and ph4 take a low level. Thus, the switches SW5 and SW6 are turned on, and the switches SW1-SW4, SW1A and SW2A are turned off. At this point, the input voltage VIN and the ground voltage GND are coupled to both ends of the capacitor 911 for charging the capacitor, so that the voltage difference between the node V1 and the node V2 equals to the input voltage VIN.

During the following period P2, the control signals ph1, ph3 and ph4 take a low level, and the control signal ph2 takes a high level. Thus, the switches SW3-SW6, SW1A and SW2A are turned off, and the switches SW1 and SW2 are turned on. At this point, the level of the node V2 rises from the original ground 0V to VIN, the level of the node V1 accordingly rises from the original VIN to 2VIN, and the capacitor COUT1 is charged for outputting the first output voltage VOUT1 with a 2VIN level.

After the second period P2 is the fourth period P4. During the fourth period P4, the control signals ph1-ph3 take a low level and the control signal ph4 takes a high level. Thus, the switches SW1-SW6 are turned off, and the switches SW1A and SW2A are turned on. At this point, the level of the node V2 drops from the original VIN to VINA, the level of the node V1 accordingly drops from the original 2VIN to VIN+VINA, and the capacitor COUT3 is charged for outputting the third output voltage VOUT3 with a VIN+VINA level.

During the following third period P3, the control signals ph1, ph2 and ph4 take a low level, and the control signal ph3 takes a high level. Thus, the switches SW1, SW2, SW5, SW6, SW1A and SW2A are turned off, and the switches SW3 and SW4 are turned on. At this point, the level of the node V1 drops from the original VIN+VINA to the ground 0V, the level of the node V2 accordingly drops from the original VINA to −VIN, and the capacitor COUT2 is charged for outputting the second output voltage VOUT2 with a −VIN level.

Figure 11:
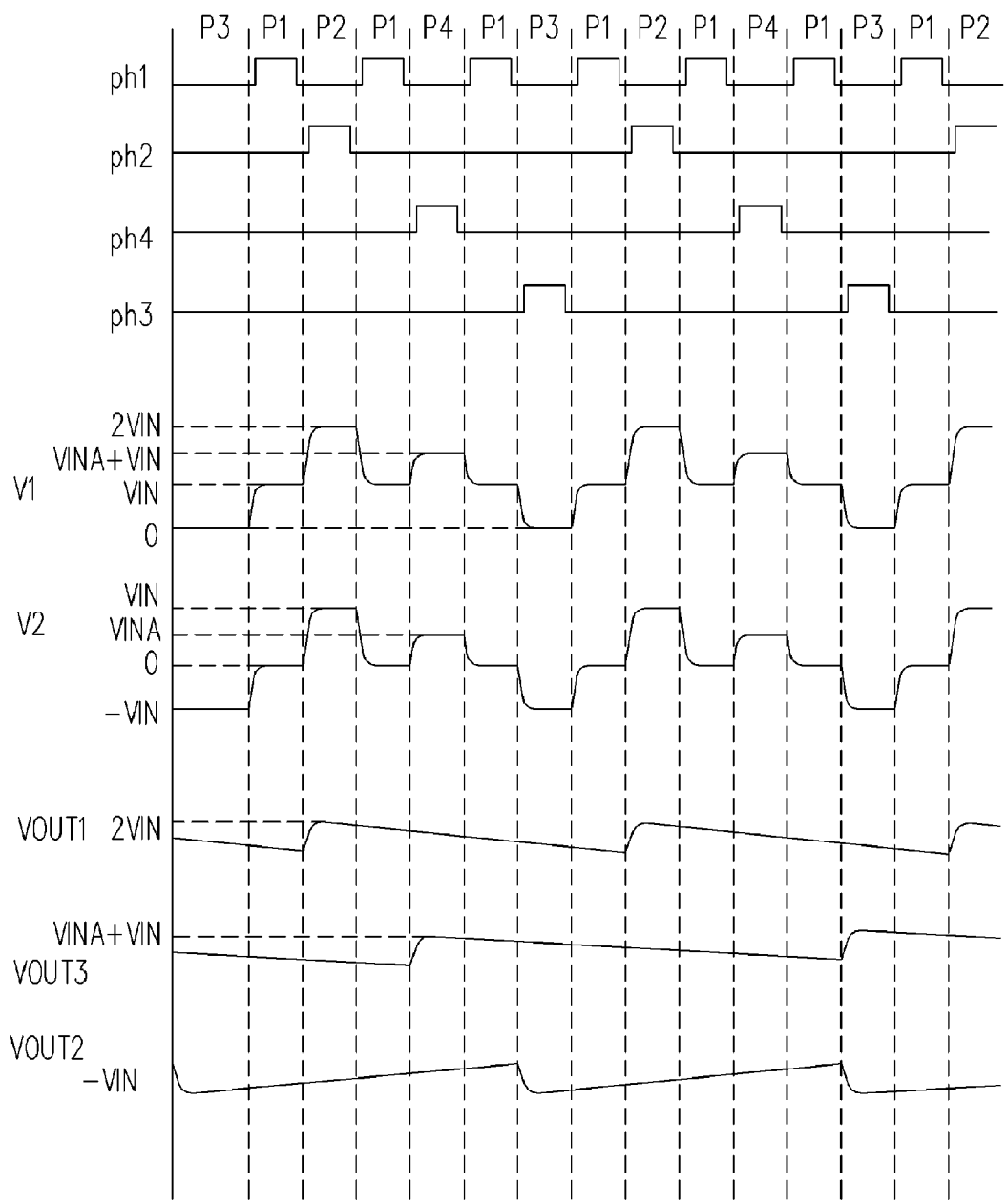

The above-mentioned first output voltage, second output voltage and third output voltage can be specified in other various levels of voltages. In addition, the control timing of each switch is not limited to the sequence shown in FIG. 10. For example, the sequence of the periods P1-P4 can be arranged as P1-P4-P3-P2 or other sequence. Moreover, prior to outputting the output voltages VOUT1, VOUT2 or VOUT3, the capacitor 911 is charged first, as shown in FIG. 11. FIG. 11 shows another control signal timing of the charge pump in FIG. 9. The control process thereof is omitted herein.

Figure 12:
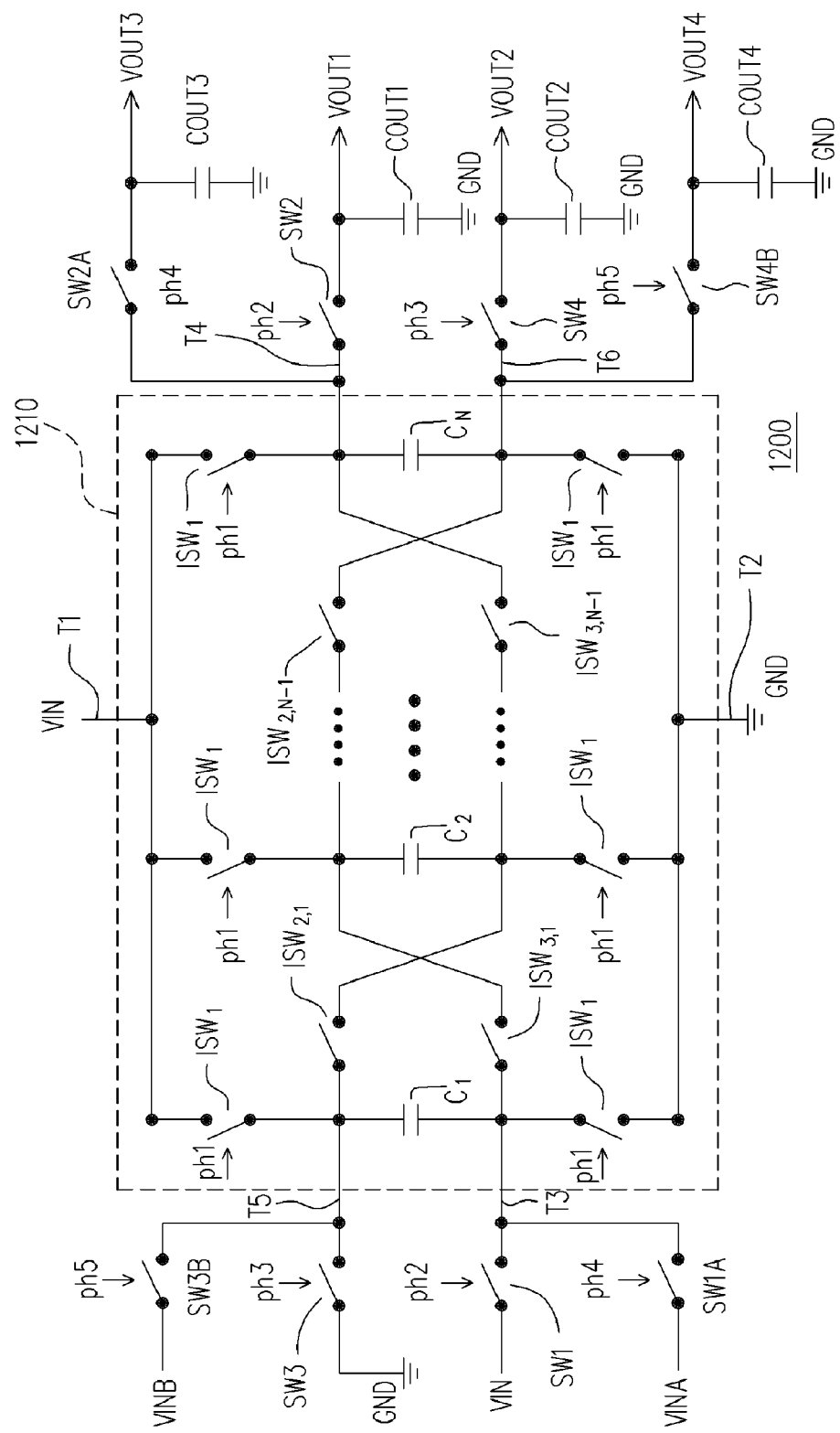
FIG. 12 is a schematic circuit drawing of a charge pump according to an embodiment of the present invention.

FIG. 12 is a schematic circuit drawing of a charge pump according to another embodiment of the present invention. Referring to FIG. 12, a charge pump 1200 includes, for example, a pump unit 1210, a first switch SW1, a second switch SW2, a third switch SW3, a fourth switch SW4, a seventh switch SW1A, an eighth switch SW2A, a first output capacitor COUT1, a second output capacitor COUT2 and a third output capacitor COUT3.

The pump unit 1210 is similar to the pump unit 810 in FIG. 8, including internal capacitors $C_1$-$C_N$ (N is an integer larger than zero), a plurality of the first internal switches $ISW_1$, second internal switches $ISW_{2,1}$-$ISW_{2,N-1}$ and third internal switches $ISW_{3,1}$-$ISW_{3,N-1}$. Details are not repeated. The switches $ISW_{2,1}$-$ISW_{2,N-1}$ of the pump unit 1210 are determined by control signals ph2 and ph4, which is different from the pump unit 810 in FIG. 8. That is, when the switch SW1 (SW2) or SW1A (SW2A) are on, the switches $ISW_{2,1}$-$ISW_{2,N-1}$ are on as well, and vice versa.

During the first period P1, the control signals ph1, ph2, ph3 and ph4 turn on the switches $ISW_1$ and turn off the switches SW1, SW2, SW3, SW4, SW1A, SW2A, $ISW_{2,1}$-$ISW_{2,N-1}$ and $ISW_{3,1}$-$ISW_{3,N-1}$. Thus, the capacitors $C_1$-$C_N$ are parallel coupled between the first end T1 and the second end T2 of the pump unit 1210. At this point, the input voltage VIN and the ground voltage GND together charge the parallel capacitors $C_1$-$C_N$, and make the voltage difference between both ends of every capacitor equal to the input voltage VIN.

During the following second period P2, the control signals ph1, ph2, ph3 and ph4 turn on the switches SW1, SW2 and $ISW_{2,1}$-$ISW_{2,N-1}$, and turn off the switches SW3, SW4, SW1A, SW2A, $ISW_1$ and $ISW_{3,1}$-$ISW_{3,N-1}$. Thus, the capacitors $C_1$-$C_N$ are connected in series and serve as an internal capacitor series, and the low-voltage end of the internal capacitor series (the second end of the capacitor $C_1$) is coupled to the third end T3 of the pump unit 1210. The high-voltage end of the internal capacitor series (the first end of the capacitor $C_N$) charges the capacitor COUT1 through the fourth end T4 of the pump unit 1210 and the switch SW2, and the capacitor COUT1 outputs the first output voltage VOUT1 with a level of (N+1) times as high as VIN.

During the third period P3, the control signals ph1, ph2, ph3 and ph4 turn on the switches SW3, SW4 and $ISW_{3,1}$-$ISW_{3,N-1}$, and turn off the switches SW1, SW2, SW1A, SW2A, $ISW_1$ and $ISW_{2,1}$-$ISW_{2,N-1}$. Thus, the capacitors $C_1$-$C_N$ are connected in series and serve as an internal capacitor series, and the high-voltage end of the internal capacitor series (the first end of the capacitor $C_1$) is coupled to the fifth end T5 of the pump unit 1210. The low-voltage end of the internal capacitor series (the second end of the capacitor $C_N$) charges the capacitor COUT2 through the sixth end T6 of the pump unit 1210 and the switch SW4, and the capacitor COUT2 outputs the second output voltage VOUT2 with a level of –N times as high as VIN.

In addition, during the fourth period P4, the control signals ph1, ph2, ph3 and ph4 in the charge pump 1200 further turn on the switches SW1A, SW2A and $ISW_{2,1}$-$ISW_{2,N-1}$, and turn off the switches SW1, SW2, SW3, SW4, ISW1 and $ISW_{3,1}$-$ISW_{3,N-1}$. Thus, the capacitors $C_1$-$C_N$ are connected in series and serve as an internal capacitor series, and the low-voltage end of the internal capacitor series (the second end of the capacitor $C_1$) is coupled to the sixth voltage (for example, the reference voltage VINA which has a voltage level different from the input voltage VIN, herein) through the third end T3 of the pump unit 1210 and the switch SW1A. The high-voltage end of the internal capacitor series (the first end of the capacitor $C_N$) charges the capacitor COUT3 through the fourth end T4 of the pump unit 1210 and the switch SW2A, and the capacitor COUT3 outputs the third output voltage VOUT3 with a level of N*VIN+VINA.

To those skilled in the art, it is easy to determine the capacitor number (i.e. the N value) inside the pump unit 1210 for actual requirement. The output voltages VOUT1, VOUT2 and VOUT3 with corresponding times of levels are accordingly produced. Besides, the times of levels of the output voltages VOUT1, VOUT2 and VOUT3 can be adjusted by setting the above-described first voltage, second voltage, the third voltage and the sixth voltage in various levels of voltages. For example, the switch SW1 in FIG. 12 can receives the ground voltage GND instead of the original input voltage VIN, and the reference voltage VINA coupled to the switch SW1A can be changed to VIN/2, so that the modified charge pump 1200 is able to output three voltage levels of N*VIN, –N*VIN and N*VIN+VIN/2.

A further alternation for those skilled in the art is that the fifth end T5 of the pump unit 1210 in the charge pump 1200 is coupled to the eighth voltage (for example, the reference voltage VINB, herein) through the ninth switch SW3B, and the sixth end T6 of the pump unit 1210 is coupled to the fourth capacitor COUT4 through the tenth switch SW4B for outputting the fourth output voltage VOUT4. Then, the switches $ISW_{3,1}$-$ISW_{3,N-1}$ of the pump unit 1210 are controlled by the control signals ph3 and ph5. That is, when the switches SW3 (SW4) or SW3B (SW4B) are on, the switches $ISW_{3,1}$-$ISW_{3,N-1}$ are also turned on, and vice versa. Consequently, during the fifth period, the internal capacitor of the pump unit 1210 in the charge pump 1200 is able to output the fourth output voltage VOUT4 based on the reference voltage VINB.

In summary, the coupling of the internal capacitors in the pump unit of the present invention is dynamic. Therefore, the internal capacitors can be shared on a same charge pump for providing at least a first output voltage and a second output voltage. In this way, the number of capacitor components and the production cost is significantly reduced. Those skilled in the art can modify the above-described embodiments and combine the variations for obtaining the output voltages with desired levels. In comparison with the prior art, the higher the times of the provided first output voltage and second output voltage, the more capacitor components are saved, which is more cost efficient.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A charge pump, for producing at least a first output voltage and a second output voltage according to an input voltage, the charge pump comprising:

a pump unit, comprising at least an internal capacitor, a first end, a second end, a third end, a fourth end, a fifth end and a sixth end, wherein the first end is coupled to the input voltage, the second end is coupled to a first voltage, for the input voltage and the first voltage to charge the internal capacitor during a first period, for the internal capacitor to provide the fourth end with the first output voltage based on a level of the third end during a second period, for the internal capacitor to provide the sixth end with the second output voltage based on a level of the fifth end during a third period;

a first switch, wherein one end thereof is coupled to a second voltage and another end thereof is coupled to the third end of the pump unit, for connecting the second voltage to the third end of the pump unit during the second period, so the level of the third end of the pump unit is the second voltage, when the first switch is turned on;

a second switch, wherein a first end thereof is coupled to the fourth end of the pump unit, for connecting the first output voltage from the fourth end of the pump unit to a second end of the second switch during the second period;

a third switch, wherein one end thereof is coupled to a third voltage and another end thereof is coupled to the fifth end of the pump unit, for connecting the third voltage to the fifth end of the pump unit during the third period, so the level of the fifth end of the pump unit is the third voltage, when the third switch is turned on; and a fourth switch, wherein a first end thereof is coupled to the sixth end of the pump unit, for connecting the second output voltage from the sixth end of the pump unit to a second end of the fourth switch during the third period, wherein during a fourth period, the internal capacitor of the pump unit provides the fourth end with a third output voltage based on the level of the third end, and the charge pump further comprises:

a fifth switch, wherein one end thereof is coupled to a fourth voltage and another end thereof is coupled to the third end of the pump unit for connecting the fourth voltage to the third end of the pump unit during the fourth period, so the level of time third end of the pump unit is the fourth voltage, when the fifth switch is turned on; and a sixth switch, wherein a first end thereof is coupled to the fourth end of the pump unit for connecting the third output voltage from the fourth end of the pump unit to a second end of the sixth switch during the fourth period.

2. The charge pump as recited in claim 1, wherein the first voltage and the third voltage are a ground voltage, and the second voltage is the input voltage.

3. The charge pump as recited in claim 1, wherein the pump unit further comprises:

a seventh switch, wherein a first end thereof is the first end of the pump unit, a second end thereof is coupled to a first end of the internal capacitor, and the first end of the internal capacitor is the fourth end and the fifth end of the pump unit; and an eighth switch, wherein a first end thereof is the second end of the pump unit, a second end thereof is coupled to a second end of the internal capacitor, and the second end of the internal capacitor is the third end and the sixth end of the pump unit.

4. The charge pump as recited in claim 1, wherein the pump unit further comprises N pieces of internal capacitors Ci, where N is an integer larger than zero and i is an integer larger than zero but smaller than or equal to N, wherein during the first period, the internal capacitors are parallel coupled between the first end and the second end of the pump unit;

during the second period, the Internal capacitors are connected in series to be a first; internal capacitor series so that a high-voltage end of the first internal capacitor series is coupled to the fourth end of the pump unit and a low-voltage end of the first internal capacitor series is coupled to the third end of the pump unit; and during the third period, the internal capacitors are connected in series to be a second; internal capacitor series so that a high-voltage end of the second internal capacitor series is coupled to the fifth end of the pump unit and a low-voltage end of the second internal capacitor series is coupled to the sixth end of the pump unit.

5. The charge pump as recited in claim 4, wherein a first end of $C_1$ is coupled to the fifth end of the pump unit, a second end of $C_1$ is coupled to the third end of the pump unit, a first end of $C_N$ is coupled to the fourth end of the pump unit, a second end of $C_N$ is coupled to the sixth end of the pump unit, and the pump unit further comprises:

a plurality of first internal switches, each disposed between a first end of the corresponding internal capacitor and the first end of the pump unit, and between a second end of the corresponding internal capacitor and the second end of the pump unit, respectively, for turning on during the first period;

a plurality of second internal switches $ISW_{2,j}$, wherein j is an integer larger than zero but smaller than N, wherein a first end of $ISW_{2,j}$ is coupled to the first end of $C_j$, a second end of $ISW_{2,j}$ is coupled to the second end of $C_{j+1}$, for turning on during the second period so that the internal capacitors are connected in series as the first internal capacitor series; and a plurality of third internal switches $ISW_{3,k}$, wherein k is an integer larger than zero but smaller than N, wherein a first end of $ISW_{3,k}$ is coupled to the second end of $C_k$, a second end of $ISW_{3,K}$ is coupled to the first end of $C_{k+1}$, for turning on during the third period so that the internal capacitors are connected in series as the second internal capacitor series.

6. The charge pump as recited in claim 1, further comprising:

a first output capacitor, wherein one end thereof is coupled to the second end of the second switch, and another end thereof is coupled to a fifth voltage;

a second output capacitor, wherein one end thereof is coupled to the second end of the fourth switch, and another end thereof is coupled to a sixth voltage; and a third output capacitor, wherein one end thereof is coupled to the second end of the sixth switch, and another end thereof is coupled to a seventh voltage.

7. The charge pump as recited in claim 6, wherein the fifth voltage, the sixth voltage and the seventh voltage are ground voltage.

8. The charge pump as recited in claim 1, wherein during a fifth period, the internal capacitor of the pump unit provides the sixth end with a fourth output voltage based on the level of the fifth end, and the charge pump further comprises:

a seventh switch, wherein one end thereof is coupled to a fifth voltage and another end thereof is coupled to the fifth end of the pump unit for connecting the fifth voltage to the fifth end of the pump unit during the fifth period, so the level of the fifth end of the pump unit is the fifth voltage, when the seventh switch is turned on;

a eight switch, wherein a first end thereof is coupled to the sixth end of the pump unit for connecting the fourth output voltage from the sixth end of the pump unit to a second end of the eight switch during the fifth period; and a first output capacitor, wherein one end thereof is coupled to the second end of the eighth switch and another end thereof is coupled to a sixth voltage.

9. The charge pump as recited in claim 8, wherein the sixth voltage is a ground voltage.

* * * * *